(12) United States Patent
Chang

(10) Patent No.: US 7,880,956 B2
(45) Date of Patent: Feb. 1, 2011

(54) ELECTROPHORETIC DISPLAY HAVING ELECTROMAGNETS

(75) Inventor: Jen-Tsorng Chang, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 12/730,261

(22) Filed: Mar. 24, 2010

(65) Prior Publication Data

US 2010/0259812 A1    Oct. 14, 2010

(30) Foreign Application Priority Data

Apr. 10, 2009   (CN) .................... 2009 1 0301461

(51) Int. Cl.
*G02B 27/10* (2006.01)
(52) U.S. Cl. ...................... 359/296; 359/290
(58) Field of Classification Search ........... 359/296
See application file for complete search history.

(56) References Cited

U.S. PATENT DOCUMENTS

2008/0180785 A1*   7/2008   Schmitz ................ 359/296

* cited by examiner

*Primary Examiner*—Jordan M. Schwartz
*Assistant Examiner*—James C Jones
(74) *Attorney, Agent, or Firm*—Raymond J. Chew

(57) ABSTRACT

An electrophoretic display includes a display panel and a scanning device. The display panel includes a magnetic rotating ball layer and a soft magnetic layer. The magnetic rotating ball layer includes a plurality of magnetic rotating balls. Two magnetic poles of each magnetic rotating ball have white and black colors respectively. The soft magnetic layer includes a plurality of soft magnetic bodies each facing at least one of the rotatable magnetic rotating balls. The scanning device is movably attached to the display panel and includes a plurality of electromagnets facing the soft magnetic layer. The electromagnets are spatially corresponding to a row of the soft magnetic bodies. Each electromagnet magnetize corresponding one soft magnetic body when the electromagnets are moved along the display panel. Each magnetic rotating ball corresponding to one soft magnetic body is driven by one soft magnetic body to display white or black colors.

20 Claims, 4 Drawing Sheets

ELECTROPHORETIC DISPLAY HAVING ELECTROMAGNETS

BACKGROUND

1. Technical Field

The present disclosure relates to a display device, particularly relates to an electrophoretic display having electromagnets.

2. Description of Related Art

A typical electrophoretic display normally includes a number of matrix-arranged pixels sandwiched between a first substrate and a second substrate. Each pixel includes a pixel electrode formed on the first substrate and a common electrode formed on the second substrate, and an electrophoretic layer sandwiched between the pixel electrode and the common electrode. The electrophoretic layer includes suspending fluid and a number of electrophoretic pigment particles distributed in the suspending fluid. When driving voltages denoted as image signals cross the pixel electrode and the common electrode are applied, in each pixel, the electrophoretic pigment particles in the suspending fluid are moved by the driving voltages and then concentrated to a predetermined location. In such a manner, the transparency of each pixel is controlled by the driving voltages, thereby displaying images on the electrophoretic display. However, the driving voltages are required to be a high-level voltage to obtain a fast enough moving speed of the electrophoretic pigment particles. Thus, the electrophoretic display driven by high-level voltages correspondingly has large power consumption.

Therefore, a new electrophoretic display is desired to overcome the above-described shortcoming.

BRIEF DESCRIPTION OF THE DRAWINGS

The components in the drawings are not necessarily drawn to scale, the emphasis instead being placed upon clearly illustrating the principles of at least one embodiment. In the drawings, like reference numerals designate corresponding parts throughout the various views.

DETAILED DESCRIPTION

Figure 1:
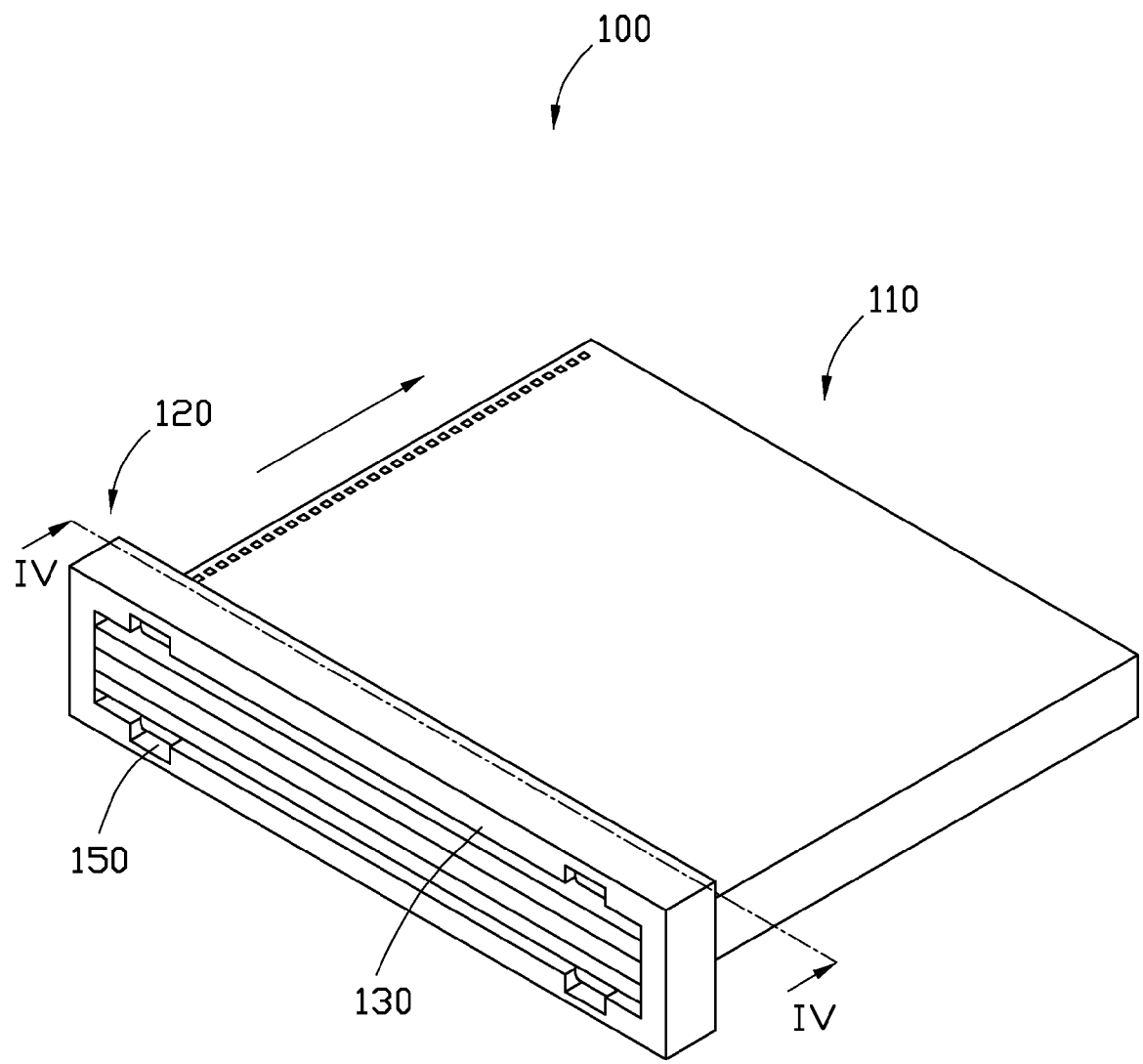
FIG. 1 is a perspective view of an electrophoretic display according to one embodiment, the electrophoretic display including a display panel.
Figure 2:
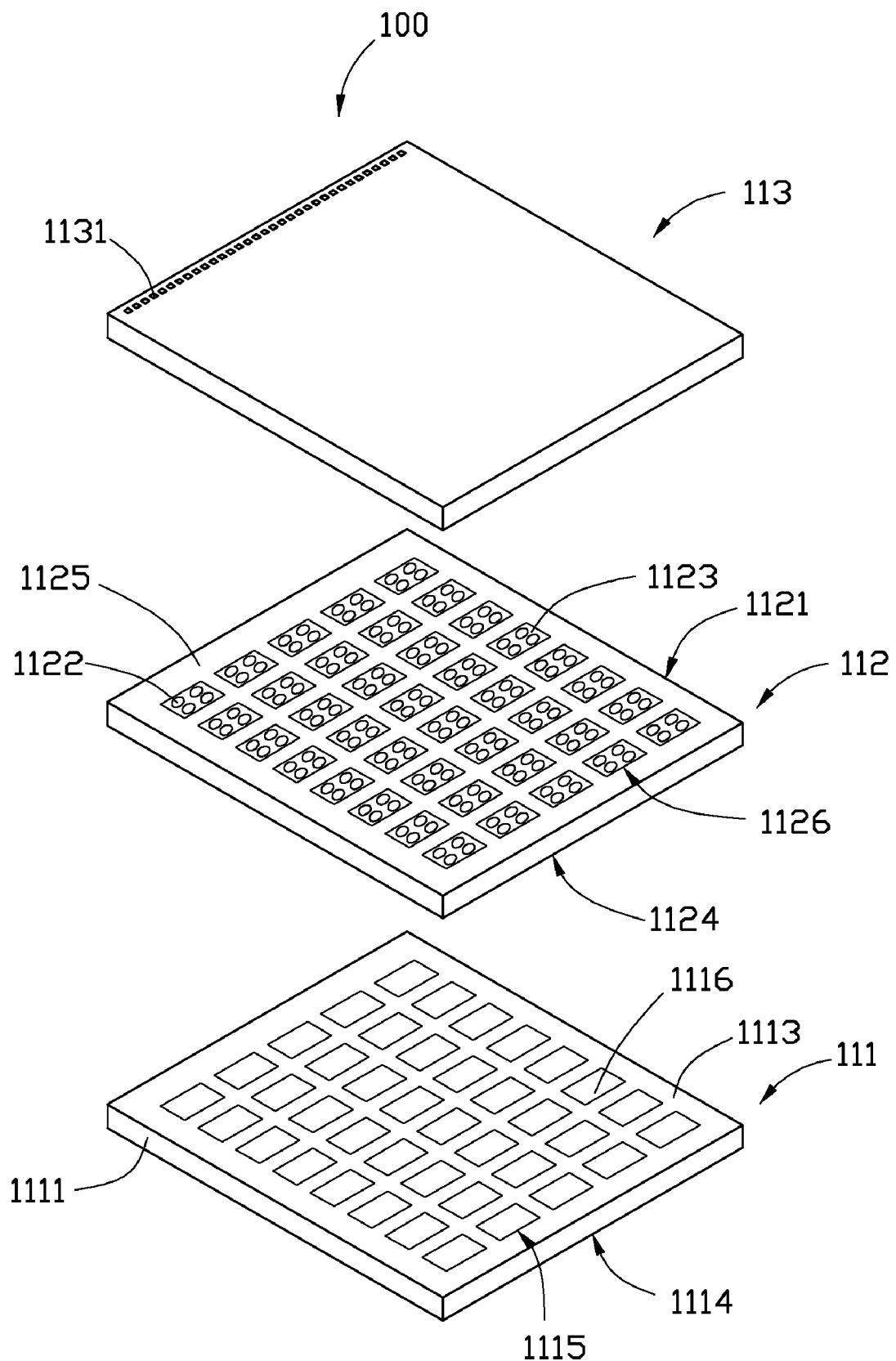
FIG. 2 is an exploded view of the display panel of the electrophoretic display of FIG. 1.
Figure 3:
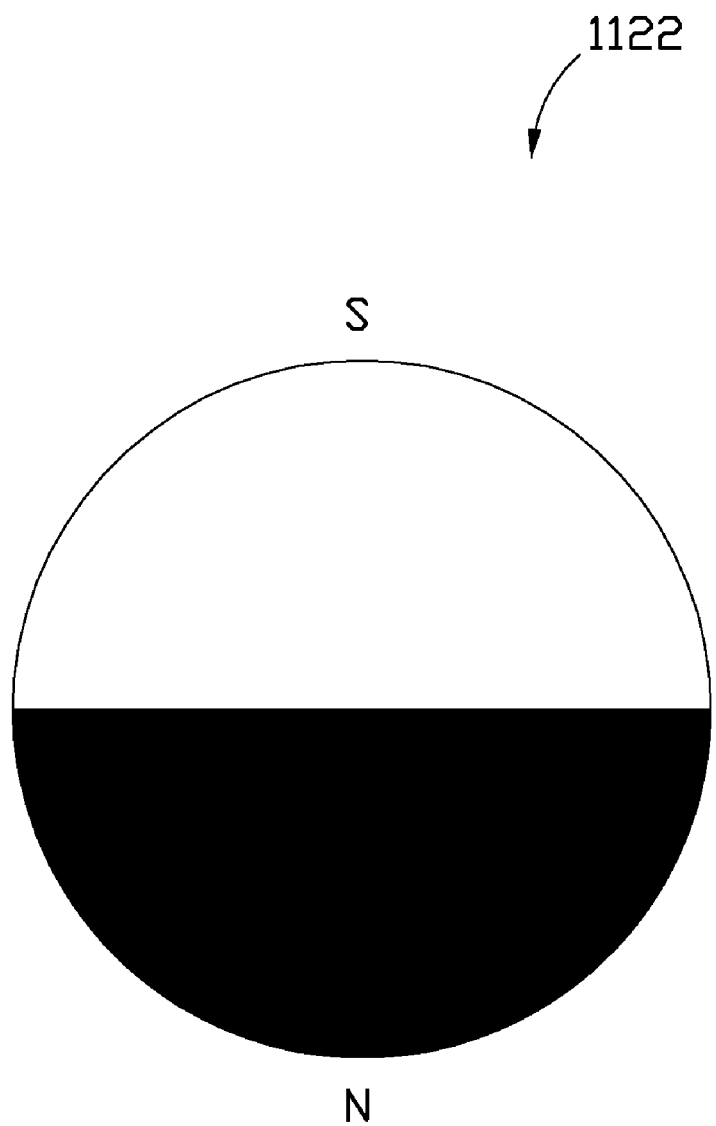
FIG. 3 is a top view of a rotating ball employed in the display panel of the electrophoretic display of FIG. 1.
Figure 4:
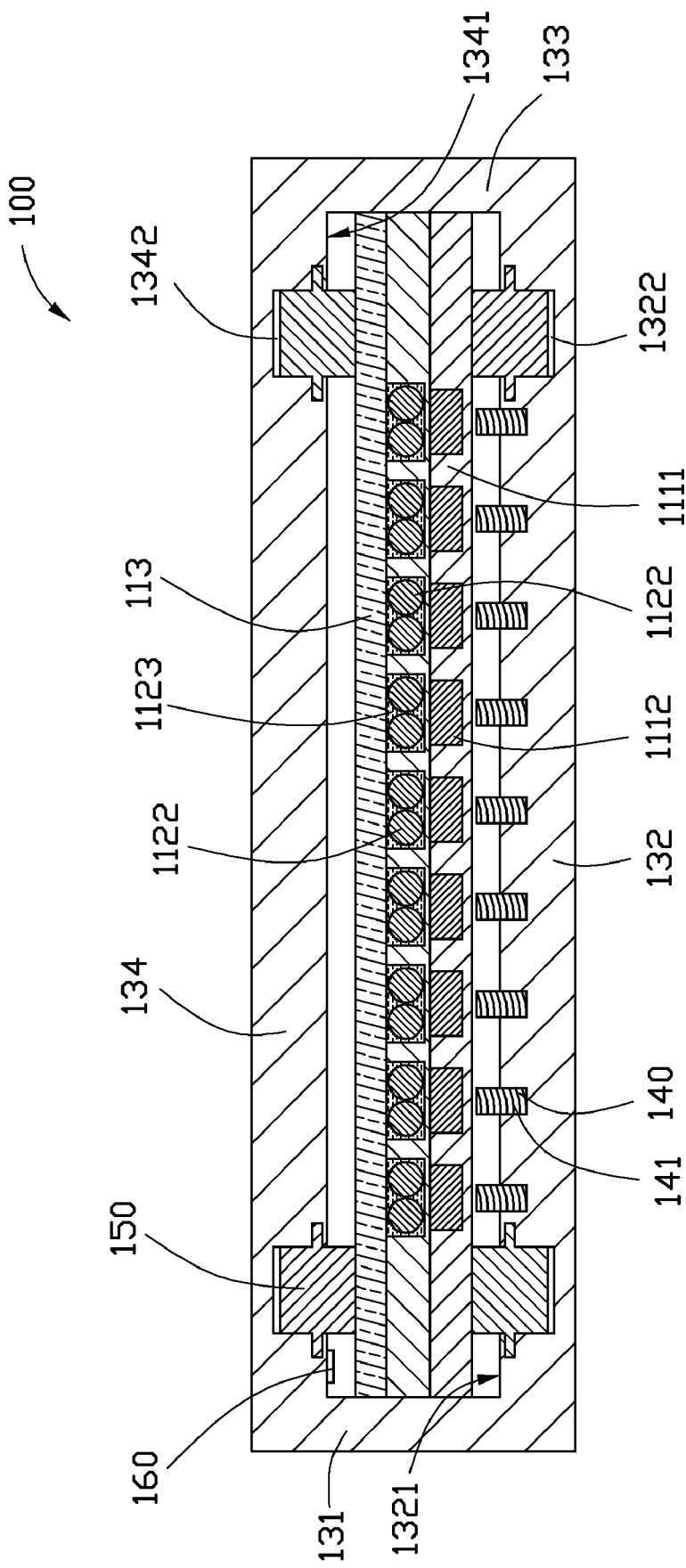
FIG. 4 is a cross-sectional view of the electrophoretic display of FIG. 1 taken along line IV-IV.

Reference will now be made to the drawings to describe various disclosed embodiments of the present disclosure in detail, wherein like numerals refer to like elements throughout.

Referring to FIGS. 1 to 4, an electrophoretic display 100 includes a display panel 110 and a scanning device 120

The display panel 110 is configured for displaying images and includes a soft magnetic layer 111, a magnetic rotating ball layer 112, and a transparent panel 113.

The soft magnetic layer 111 includes a first substrate 1111 and a number of soft magnetic bodies 1112 embedded in the first substrate 1111. The first substrate 1111 is configured for supporting the magnetic rotating ball layer 112. In this embodiment, the first substrate 1111 has a square configuration and includes a first surface 1113 and a second surface 1114 opposite to the first surface 1113. A number of receiving cavities 1115 arranged in rows and columns configured for accommodating the soft magnetic bodies 1112 are defined in the first substrate 1111. Each receiving cavity 1115 extends from the first surface 1113 to the second surface 1114 and has a circular or square entrance.

In one embodiment, the receiving cavities 1115 are configured to have the same dimension and spaced or isolated from each other with constant distance intervals. The soft magnetic bodies 1112 are made of soft magnetic materials such as soft iron, silicon steel, or iron and nickel alloy. The soft magnetic bodies 1112 can repeatedly be magnetized and demagnetized.

Each soft magnetic body 1112 is embedded in the first substrate 1111 with a top surface 1116 exploded from the first surface 1113 of the first substrate 1111. In this embodiment, the top surface 1116 of each soft magnetic body 1112 is aligned with first surface 1113. Alternatively, the top surface 1116 of each soft magnetic body 1112 is positioned to be lower than the first surface 1113.

The magnetic rotating ball layer 112 includes a second substrate 1121, a plurality of magnetic rotating balls 1122, and a plurality of filling materials 1123. The second substrate 1121 includes an upper surface 1125 and a second scanning surface 1124 opposite to the upper surface 1125. The second scanning surface 1124 of the second substrate 1121 is contacted with the first surface 1113 of the first substrate 1111. A plurality of blind holes 1126 are defined in the upper surface 1125 of the second substrate 1121. The blind holes 1126 extend from the upper surface 1125 towards the second scanning surface 1124 along a direction perpendicular to the upper surface 1125 and are each aligned with one corresponding receiving cavity 1115. The number of the blind holes 1126 is equal to that of the receiving cavities 1115 and the arrangement of the blind holes 1126 is similar to that of the receiving cavities 1115 in such a way that the blind holes 1126 are also arranged in rows and columns.

Each blind hole 1126 has a similar cross-sectional configuration corresponding to each receiving cavity 1115, for example, each blind hole 1126 also has a circular or square entrance just like the receiving cavity 1115. The blind holes 1126 are configured for accommodating the magnetic rotating balls 1122, correspondingly. In this embodiment, a depth of each blind hole 1126 is slightly larger than a diameter of each magnetic rotating ball 1122. The length and width of each blind hole 1126 are two times larger than a diameter of each magnetic rotating ball 1122. Thus, four magnetic rotating balls 1122 are completely received in each blind hole 1126. Alternatively, a volume of a space defined by each blind hole 1126 can be adjusted according to a number of the magnetic rotating balls 1122 that are accommodated therein.

The magnetic rotating balls 1122 are made of permanent magnets. Two hemispherical portions of each magnetic rotating ball 1122 correspond to different magnetic poles and have different colors. In one embodiment, a diameter of each magnetic rotating ball 1122 is less than 0.1 millimeters. A hemispherical portion indicated S pole of each magnetic rotating ball 1122 has white color. The other hemispherical portion indicated N pole of each magnetic rotating ball 1122 has black color. Each magnetic rotating ball 1122 is colored by smearing black or white pigment on its surface.

The blind holes 1126 are filled using the filling materials except for spaces occupied by the magnetic rotating balls 1122 in each blind holes 1126. The filling materials 1123 are configured for suspending the magnetic rotating balls 1122 when the magnetic rotating balls 1122 are rotated by a magnetic field. The filling materials 1123 are also configured for providing a resistance to stop each magnetic rotating ball 1122 as soon as the magnetic fields for moving the magnetic rotating balls 1122 have disappeared. In one embodiment, the filling materials 1123 are made of transparent liquid without capability for dissolving the pigments on the surface of each magnetic rotating ball 1122.

The transparent panel 113 has a quadrate configuration like the second substrate 1121. In this embodiment, the transparent panel 113 is configured for tightly contacting with and covering the upper surface 1125 of the second substrate 1121 to protect the magnetic rotating ball layer 112. A number of spaced marks 1131 spaced at equal intervals are provided near a longer edge of the quadrate transparent panel 113 and arranged to align with one another. At least one of the marks 1131 is aligned with a row of the magnetic rotating balls 1122

In an alternative embodiment, a first gel layer (not shown) is provided between the second scanning surface 1124 and first surface 1113 to fix the second substrate 1121 on the first substrate 1111. A second gel layer (not shown) is provided between the upper surface 1125 and the transparent panel 113 to fix the transparent panel 113 on the second substrate 1121. Thus, the display panel 110 is tightly integrated into one body.

The scanning device 120 is configured for scanning the display panel 110 along a direction of the marks 1131 and then magnetizing the corresponding soft magnetic bodies 1112 according to image signals. Therefore, the magnetic rotating balls 1122 spatially corresponding to the magnetized soft magnetic bodies 1112 are rotated by the magnetic fields of the magnetized soft magnetic bodies 1112. For example, one hemispherical portion of each magnetic rotating ball 1122 indicated S pole or N pole is rotated to face just one aligned soft magnetic body 1112 while the other hemispherical portion of the same magnetic rotating ball 1122 is rotated to face the transparent panel 113. As a result, some of the magnetic rotating balls 1122, which S poles face to the transparent panel 113, are observed to be a white color in a view angle from outside through the transparent panel 113. Some other of the magnetic rotating balls 1122, which N poles face the transparent panel 113 are observed to be a black color in the same view angle. That is, the display panel 110 can display monochrome images considering all the magnetic rotating balls 1122 each displays two colors, white and black.

Referring also to FIG. 1, the scanning device 120 includes a scanning frame 130, a number of electromagnets 140, four rollers 150, a mark detector 160, and a controller (not shown).

The scanning frame 130 has a square annular configuration and includes a first supporting bar 131, a first setting bar 132 facing the soft magnetic layer 111, a second supporting bar 133, and a second setting bar 134 facing transparent panel 113. The first supporting bar 131, first setting bar 132, second supporting bar 133, and the second setting bar 134 are connected end to end in that order. The first setting bar 132 and the second setting bar 134 are parallel with each other. The first supporting bar 131 and the second supporting bar 133 are parallel with each other.

A gap between the first supporting bar 131 and the second supporting bar is slightly wider than or approximately equal to the width of the display panel 110. A gap between the first setting bar 132 and the second setting bar 134 is slightly wider than or approximately equal to the thickness of the display panel 110. Thus, the scanning frame 130 is sleeved at one end of the display panel 110 such that the first setting bar 132 is parallel to the display panel 110 and the first supporting bar 131 is perpendicular to the display panel 110. In this embodiment, both the first setting bar 132 and the second setting bar 134 have no contact with the display panel 110.

The first setting bar 132 includes a first scanning surface 1321 facing the second surface 1114 of the first substrate 1111 of the display panel 110. Two first notches 1322 are defined in the first scanning surface 1321 of the first setting bar 132 for receiving two rollers 150. The two first notches 1322 are positioned at two opposite sides of the first setting bar 132. That is, the two first notches 1322 are positioned in the vicinities of the first supporting bar 131 and the second supporting bar 133, correspondingly.

The second setting bar 134 includes a second scanning surface 1341 facing the transparent panel 113 of the display panel 110. Two second notches 1342 are defined in the second scanning surface 1341 of the second setting bar 134 for receiving the other two rollers 150. Similarly, the two second notches 1342 are positioned at two opposite sides of the second setting bar 134 in the vicinities of the first supporting bar 131 and the second supporting bar 133, correspondingly.

The plurality of electromagnets 140 is configured for magnetizing the soft magnetic bodies 1112 of the display panel 110 when the scanning device 120 is moved by the rollers 150 along the display panel 110 to scan the display panel 110.

The electromagnets 140 are embedded in the first scanning surface 1321 of the first setting bar 132 and arranged along the first setting bar 132 between the two first notches 1322. Furthermore, the electromagnets 140 are aligned with each other and in parallel with each row of soft magnetic bodies 1112. A distance between the adjacent two electromagnets 140 is approximately equal to the distance between the two soft magnetic bodies 1112. Thus, each electromagnet 140 correspondingly faces one corresponding soft magnetic body 1112.

Each electromagnet 140 includes a winding twisted around its central axis perpendicular to the second surface 1114 of the first substrate 1111. Thus, each electromagnet 140 can generates two magnetic fields with reversed magnetic forces by changing the current direction flowing through its winding 141.

In one embodiment, when a current is provided by the scanning device 120 and flows through the winding 142 of each electromagnet 140, each electromagnet 140 generates a first magnetic field to make one end of each electromagnet 140 facing the second surface 1114 of the first substrate 1111 to be considered as an S magnetic pole. Thus, one end of the corresponding soft magnetic body 1112 facing the electromagnet 140 is magnetized to be an N magnetic pole and the other end of the corresponding soft magnetic body 1112 far from the electromagnet 140 is magnetized to be an S magnetic pole.

Similarly, when an inversed current is provided by the scanning device 120 and flows through the winding 142 of each electromagnet 140, each electromagnet 140 generates a second magnetic field to make one end of each electromagnet 140 facing the second surface 1114 of the first substrate 1111 to be considered N magnetic pole. Thus, one end of the corresponding soft magnetic body 1112 facing the electromagnet 140 is magnetized to be an S magnetic pole and the other end of the corresponding soft magnetic body 1112 far from the electromagnet 140 is magnetized to be an N magnetic pole.

After the soft magnetic bodies 1112 are magnetized or re-magnetized by the electromagnet 140. If a direction from S pole to N pole of each magnetic rotating ball 1122 is the same as that of one corresponding re-magnetized soft magnetic bodies 1112. The magnetic rotating ball 1122 is held still by the electromagnet 140 otherwise, the magnetic rotating ball 1122 is rotated by the electromagnet 140 to be arranged in the same way as the re-magnetized soft magnetic bodies 1112.

Thus, the white hemispherical portion or the black hemispherical portion of each magnetic rotating ball 1122 can be driven by the corresponding magnetized soft magnetic body 1112 to face the transparent panel 113. Therefore, all the magnetic rotating balls 1122 with their white hemispherical portions facing the transparent panel 113 are observed to be a white color, and all the magnetic rotating balls 1122 with their back hemispherical portions facing the transparent panel 113 are observed to be a black color. As a result, the display panel 110 can display monochrome images when each one of the magnetic rotating balls 1122 displays white and black colors.

The four rollers 150 of the scanning device 120 are configured for scrolling the scanning device 120 along the display panel 110. A plurality of step motors (not shown) are provided to drive the four rollers 150 so that the four rollers 150 can rotate and make the scanning device 120 move along the display panel 110.

In this embodiment, two rollers 150 are received in the two first notches 1322, and a top portion of each roller 150 protruded from the scanning surface 1321 of the first setting bar 132 to contact with first substrate 1111 of the display panel 110. Two more rollers 150 are received in the two second notches 1342, and a bottom portion of each roller 150 protrudes from second scanning surface 1341 of the second setting bar 134 to contact with transparence substrate 113 of the display panel 110.

In an alternative embodiment, the rollers 150 are mounted in the first supporting bar 131 and the second supporting bar 133 to contact with and scroll two opposite sides of the display panel 110 adjacent to the first and second supporting bars 131 and 133.

The mark detector 160 is mounted on the second scanning surface 1341 of the second setting bar 134 adjacent to one of the rollers 150. The mark detector 160 is arranged to be over the marks 1131 to detect the marks 1131 and generate a position signal according to the position of the detected marks 1131.

The controller is electrically connected to the electromagnets 140 and the mark detector 160. The controller is configured for receiving the position signal from the mark detector 160 and calculating a position of the marks 1131 according to the received position signal.

Then, each time, the controller controls the current direction of each winding 141 of the electromagnets 140 to re-magnetize a row of soft magnetic bodies 1112 according to the received position signal and an external image signal. Some of the magnetic rotating balls 1122 are rotated while some of the other magnetic rotating balls 1122 are keep still by the re-magnetized soft magnetic body 1112 to display a desired monochrome image.

Because the soft magnetic body 1112 can keep its magnetism for a long time, the image displayed on the display panel 110 can remain until the display panel 110 is scanned again by the scanning device 120. Furthermore, because the electromagnets 140 are employed to magnetize the soft magnetic bodies 1112, smaller current can be applied to the winding 141 of each electromagnet 140 for magnetizing the soft magnetic bodies 1112. Thus, the display panel 110 avoids using high level driving voltages and saves power.

It is to be understood, however, that even though numerous characteristics and advantages of certain inventive embodiments have been set out in the foregoing description, together with details of the structures and functions of the embodiments. The disclosure is illustrative only; and that changes may be made in detail, especially in matters of arrangement of parts within the principles of present invention to the full extent indicated by the broad general meaning of the terms in which the appended claims are expressed.

What is claimed is:

1. An electrophoretic display comprising a display panel comprising:
   a magnetic rotating ball layer comprising a plurality of magnetic rotating balls arranged in rows and columns, two magnetic poles of each of the magnetic rotating balls having black and white colors respectively, and
   a soft magnetic layer opposite to magnetic rotating ball layer, the soft magnetic layer comprising a plurality of soft magnetic bodies arranged in rows and columns, wherein each soft magnetic body facing at least one of the rotatable magnetic rotating balls, and
   a scanning device movably attached to the display panel, the scanning device comprising a plurality of electromagnets facing the soft magnetic layer, the electromagnets arranged in a row for spatially corresponding to each row of the soft magnetic bodies, wherein each of the electromagnets is configured for magnetizing corresponding one of the soft magnetic bodies when the electromagnets are moved along the display panel, and each of the magnetic rotating balls is driven by one of the soft magnetic bodies to display white color or black color.

2. The electrophoretic display of claim 1, wherein the magnetic rotating ball layer further comprises a substrate defining a plurality of blind holes accommodating the rotatable magnetic rotating balls.

3. The electrophoretic display of claim 2, wherein the magnetic rotating ball layer further comprises a plurality of filling materials, each of the blind holes filled using the filling materials.

4. The electrophoretic display of claim 3, wherein the plurality of filling materials are configured for suspending the magnetic rotating balls.

5. The electrophoretic display of claim 2, wherein a depth of each of blind holes is larger than a diameter of each of the magnetic rotating balls.

6. The electrophoretic display of claim 2, wherein the plurality of blind holes are arranged in rows and columns.

7. The electrophoretic display of claim 1, wherein the soft magnetic layer further comprises a substrate defining a plurality of cavities accommodating the soft magnetic bodies.

8. The electrophoretic display of claim 7, wherein the soft magnetic bodies are embedded in the substrate with a portion exposed at a surface of the substrate.

9. The electrophoretic display of claim 7, wherein the cavities are arranged in rows and columns spatially corresponding to the magnetic rotating balls.

10. The electrophoretic display of claim 1, wherein the display panel comprises a transparent panel configured for protecting the magnetic rotating ball layer.

11. The electrophoretic display of claim 10, wherein the transparent panel tightly contact and cover the magnetic rotating ball layer.

12. The electrophoretic display of claim 10, wherein the transparent panel comprises a plurality of marks arranged along a longer edge of the transparent panel, the scanning device comprises a mark detector configured for detecting the marks and generate position signals according to detected positions of the marks.

13. The electrophoretic display of claim 12, wherein the marks are equidistantly spaced from each other.

14. The electrophoretic display of claim 13, wherein a row of the plurality of magnetic rotating balls is aligned with at least one of the marks.

15. The electrophoretic display of claim 14, wherein the scanning device comprises a frame, the frame comprises a first supporting bar, a first setting bar, a second supporting bar, and a second setting bar connected end to end in that order, the first setting bar facing the soft magnetic layer, the second setting bar facing magnetic rotating ball layer.

16. The electrophoretic display of claim 15, wherein the scanning device further comprises a plurality of rollers configured for scrolling the scanning device to move along the display panel, a plurality of notches are defined in the first and the second setting bars for mounting the plurality of rollers.

17. The electrophoretic display of claim 15, wherein the electromagnets are arranged along the first setting bar.

18. The electrophoretic display of claim 17, wherein each electromagnet comprises a winding and the scanning device further comprises a controller electrically connected to the plurality of electromagnets.

19. The electrophoretic display of claim 18, wherein the controller is configured for controlling a current direction of current flowing in each winding.

20. The electrophoretic display of claim 1, wherein diameters of the plurality of magnetic rotating balls are in the range from 1 micron to 100 microns.

* * * * *